(12) United States Patent
Prabhakaran et al.

(10) Patent No.: US 10,644,965 B2
(45) Date of Patent: May 5, 2020

(54) PLACEMENT OF DEVICES BASED ON POLICIES AND BENCHMARK DATA

(71) Applicant: VMWARE, INC., Palo Alto, CA (US)

(72) Inventors: Diwakar Prabhakaran, Bangalore (IN); Tejas Panchal, Bangalore (IN); Bhaskardas Kambivelu, Bangalore (IN); Nivetha R, Bangalore (IN); Rohit Parashar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 326 days.

(21) Appl. No.: 14/990,809

(22) Filed: Jan. 8, 2016

(65) Prior Publication Data
US 2017/0063644 A1   Mar. 2, 2017

(30) Foreign Application Priority Data

Aug. 28, 2015  (IN) .......................... 4532/CHE/2015

(51) Int. Cl.
*H04L 12/24* (2006.01)

(52) U.S. Cl.
CPC ...... *H04L 41/5009* (2013.01); *H04L 41/5022* (2013.01)

(58) Field of Classification Search
CPC ......... G06F 2009/4557; G06F 9/45558; G06F 9/45533; G06F 9/4856; G06F 9/505; G06F 9/5077; G06Q 10/0635; G06Q 30/0241; H04N 21/4516; H04N 21/6125; H04L 63/1433
See application file for complete search history.

(56) References Cited

U.S. PATENT DOCUMENTS

| | | | | |
|---|---|---|---|---|
| 7,693,827 B2* | 4/2010 | Zamir | ..................... | H04L 67/22 707/999.003 |
| 8,762,326 B1* | 6/2014 | Zhou | ................... | G06F 16/9535 707/609 |
| 8,781,994 B2* | 7/2014 | Zafar | ................... | G06Q 10/107 706/62 |
| 2006/0271972 A1* | 11/2006 | Pai | ..................... | H04N 7/17327 725/86 |
| 2007/0204266 A1* | 8/2007 | Beaty | .................. | G06F 9/45558 718/1 |
| 2007/0276870 A1* | 11/2007 | Rosenberg | .............. | G06F 16/40 |
| 2008/0051994 A1* | 2/2008 | Fisher | .................... | G06Q 30/02 701/414 |
| 2008/0222638 A1* | 9/2008 | Beaty | .................. | G06F 9/45558 718/100 |
| 2011/0131204 A1* | 6/2011 | Bodin | ................... | G06F 16/955 707/727 |

(Continued)

*Primary Examiner* — Ninos Donabed

(57) ABSTRACT

The present disclosure is related to methods, systems, and machine-readable media for assigning devices to clusters. The system includes a benchmark engine to collect and store the benchmark data for a device that is assigned to a first cluster of devices. The system includes a score engine to create a device specification score based on the benchmark data and a popularity score based on the benchmark data. The system includes a cluster engine to determine, whether to reassign the device to a second cluster of devices based on a policy of the first cluster of devices, a policy of the second cluster of devices, and at least one of the device specification score and the popularity score.

21 Claims, 3 Drawing Sheets

(56) References Cited

U.S. PATENT DOCUMENTS

| | | | |
|---|---|---|---|
| 2012/0130781 A1* | 5/2012 | Li | G06Q 30/0241 705/14.4 |
| 2013/0144871 A1* | 6/2013 | Xia | G06F 16/78 707/727 |
| 2014/0173594 A1* | 6/2014 | Ng | G06F 9/45533 718/1 |
| 2014/0229828 A1* | 8/2014 | Bilinski | G06F 16/639 715/716 |
| 2014/0289225 A1* | 9/2014 | Chan | H04L 67/1095 707/722 |
| 2015/0347357 A1* | 12/2015 | Maughan | G06F 17/2247 715/205 |
| 2015/0348431 A1* | 12/2015 | Straker | G09B 5/00 434/309 |
| 2016/0140519 A1* | 5/2016 | Trepca | G06Q 20/12 705/26.44 |
| 2016/0313957 A1* | 10/2016 | Ebert | G06F 3/14 |

* cited by examiner

PLACEMENT OF DEVICES BASED ON POLICIES AND BENCHMARK DATA

RELATED APPLICATIONS

Benefit is claimed under 35 U.S.C. 119(a)-(d) to Foreign application Serial No. 4532/CHE/2015 filed in India entitled "PLACEMENT OF DEVICES BASED ON POLICIES AND BENCHMARK DATA", on Aug. 28, 2015, by VMware, Inc., which is herein incorporated in its entirety by reference for all purposes.

BACKGROUND

Virtual computing instances (VCIs), such as virtual machines, virtual workloads, data, compute nodes, clusters, non-virtualized physical hosts, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed. A computing device including the pool of computing resources can host a hypervisor which can host the VCIs. Computing devices can be grouped into clusters. Each cluster can be associated with a service level. Updating the computing devices can include assigning the particular computing device to a cluster.

DETAILED DESCRIPTION

Figure 1:
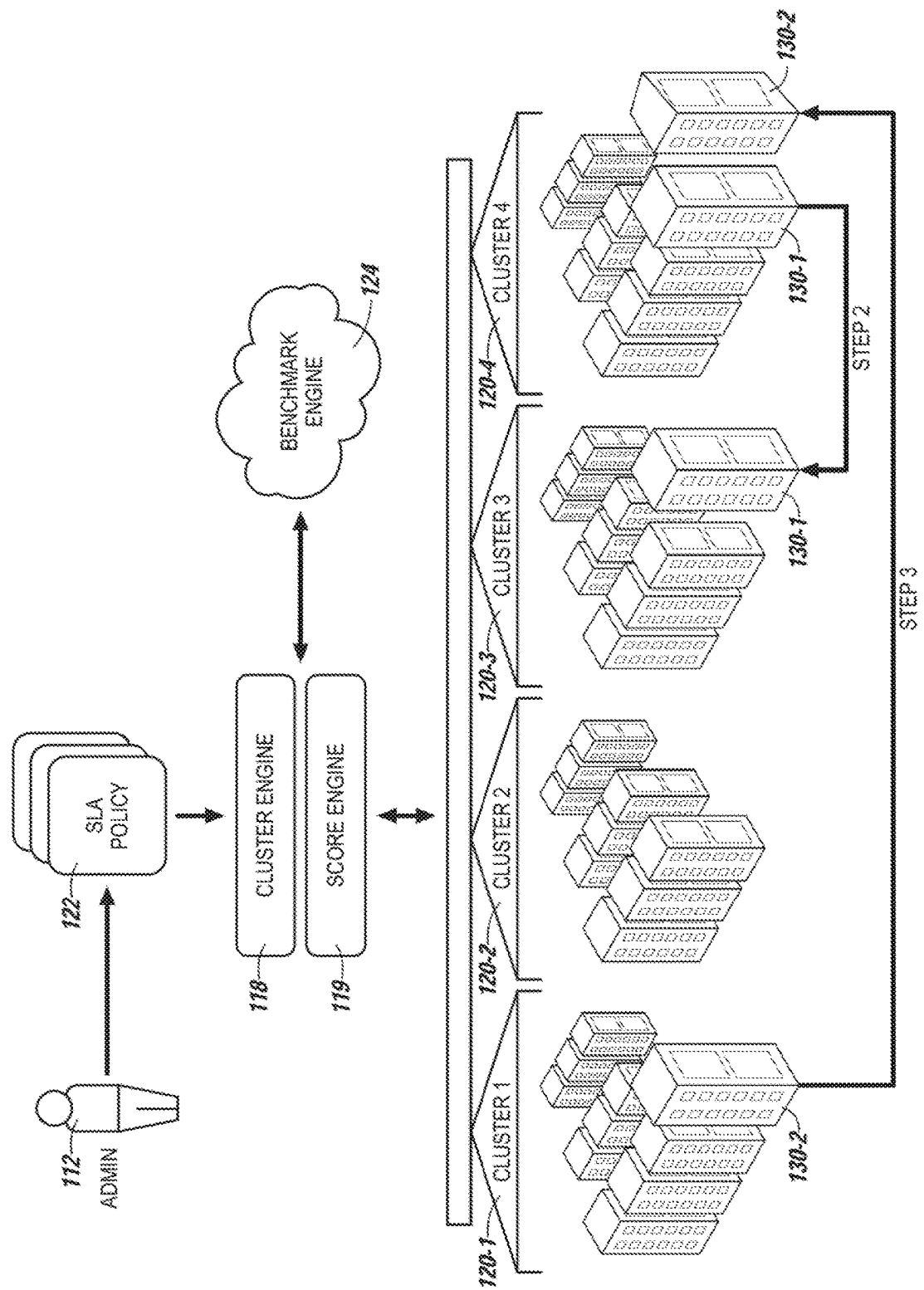
FIG. 1 is a block diagram of a system for assigning devices to clusters according to a number of embodiments of the present disclosure.

The term "virtual computing instance" (VCI) covers a range of computing functionality. VCIs may include non-virtualized physical hosts, virtual machines (VMS) and/or containers. Containers can run on a host operating system without a hypervisor or separate operating system, such as a container that runs within Linux. A container can be provided by a virtual machine that includes a container virtualization layer (e.g., Docker). A VM refers generally to an isolated user space instance, which can be executed within a virtualized environment. Other technologies aside from hardware virtualization can provide isolated user space instances, also referred to as VCIs. The term "VCI" covers these examples and combinations of different types of VCIs, among others.

VCIs, in some embodiments, operate with their own guest operating systems on a host using resources of the host virtualized by virtualization software (e.g., a hypervisor, virtual machine monitor, etc.). The hosts can be a computing device (e.g., hardware and or machine executable instructions) that can provide resources to the VCIs. A number of devices can be grouped into clusters. A number of clusters can be grouped into a data center. A cluster can include a number of devices that provide a service that is compliant with a policy. The policy can define the service that a cluster provides. For example, a policy can be a service level agreement (SLA). Although the examples provided in FIGS. 1 to 3 describe a SLA policy other types of policies can be used. A data center can be a physical data center and/or a logical data center. A physical data center can be a physical location under which clusters of devices are hosted. A logical data canter can include clusters of devices that are connected via a logical connection. A service can include storage services, computing services, and/or VCI services, among other types of service. A service provided can be defined via an SLA policy. For example, an SLA can include a first policy that provides a highest level of service, a second policy that provides a next-to highest level of service, and/or a third policy that provides the lowest level of service. An SLA can include policies other than those described herein.

An SLA policy can define the hardware and/or software that is used in providing a service. A cluster of devices can include hardware and/or software that meet the associated SLA policy. Adding devices to a cluster can include determining whether the device can meet the SLA policy that is associated with the cluster.

A determination can also be made as to whether an aging device assigned to a cluster continues to meet the associated SLA policy. As used herein, an aging device describes a device that was previously assigned to a cluster after a passage of a predetermined amount of time. A device describes a device that is assigned to a cluster and/or was previously assigned to a cluster. A new device describes a device that has not previously been assigned to a cluster. If an aging device (e.g., existing host) assigned to a cluster does not meet the associated SLA policy, then the aging device can be moved to a different cluster (e.g., downgraded). In a number of embodiments, a new device and/or a device can be assigned to a cluster based on an SLA policy. The new device and/or the device can be assigned to the cluster if at least one of a device specification score and a popularity score meet the SLA policy.

A device specification can define the capabilities of a device and/or components that comprise the device. A device specification score can define the capabilities of a device as compared to the capabilities of other devices. A device specification score can be a scale value (e.g., 1 to 10). A device specification of a first device can define a central processing unit (CPU) and/or a memory that comprises the first device. A device can also be a network device and/or storage device, among other types of devices. The device specification score can define the CPU and/or memory of the first device as compared to other devices in the cluster, devices in different clusters, devices in a data center, devices in a different data center other than the data center under which the first device is stored, and/or devices in a market. As used herein, a device is in a market when the device is offered for sale within a geography. The offer for sale can include any type of offer including an offer over the World Wide Web.

A device usage can define a popularity of a device and/or components in the device. The popularity score of a device and/or components in the device can be defined in terms of the usage of the device and/or the components as compared to the usage of other devices and/or components. For example, a usage of a device can indicate that thirty percent of devices in a cluster use a target CPU and/or a target memory. A popularity scale can define a scale value (e.g., 1 to 10) that can indicate the popularity of a device and/or components within a cluster, within a plurality of clusters, within a data center, and/or within a plurality of data centers.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense. (i.e., must). The term "include," and derivations thereof, mean "including, but not limited to."

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of a system for assigning devices to clusters according to a number of embodiments of the present disclosure. FIG. 1 includes administrator 112, a cluster engine 118, an SLA policy 122, a benchmark engine 124, clusters 120-1 to 120-4, devices 130-1 and 130-2. The clusters 120-1, 120-2, 120-3, 120-4 are referred to generally as clusters 120. The devices 130-1 and 130-2 are referred to generally as devices 130. As used herein, a computing engine can include hardware firmware, logic, and/or executable instructions, but includes at least hardware (e.g., a processor, transistor logic, application specific integrated circuit (ASIC), memory, etc.) executing instructions to perform particular actions, tasks and functions described in more detail herein.

Benchmark engine 124 can maintain data describe devices, device components, and/or device usage. The data can include metrics. The metrics can be stored in a memory resource. There are many different types of memory resources including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

The benchmark engine 124 can store data via a storage system that can include local storage and/or cloud storage. The storage system can include hardware, machine readable instructions (MRI) (e.g., software), and/or firmware to store data. The storage system can store data using a database, a file system, and/or a different storage system.

A metric can include a percentage of devices that include a number of CPUs, a percentage of devices that include a memory size, a percentage of devices that were released at a particular year, and/or a percentage of devices that include a number of CPU cores, among other metrics. The above metrics can include a device specification value within a device specification range. A device specification range an include a number of CPUs such as 1 to 4 CPUs, a memory size such as 16 gigabytes (GB) to 1024 GB, device release year such as 2009 to 2015, CPU cores such as 2 cores to 16 cores. The above ranges are given by way of example and are not limiting. A device specification value for the number of CPUs can include 1 CPU, 2 CPUs, 3 CPUs, or 4 CPUs. The device specification range can change with the release of new devices and/or device components. Corresponding device usage values for a metric that defines a number of CPUs can include 5%, 15%, 70%, and 10%. That is, 5% of devices caninclude 1 CPU, 15% of devices can include 2 CPUs, 70% of devices can include 3 CPUs, and 10% of devices can include 4 CPUs. The device usage values, as described above, can be in relation to a cluster, a data center, an industry, and/or a market. For example, 5% of devices in a cluster include 1 CPU.

The benchmark engine 124 can be maintained by a first party and/or a third party that is different than the first party that controls the data center that hosts the clusters 120. The first party can include an administrator 112 of a data center and/or the data center. The benchmark engine 124 can be customized for a data center. A number of weights can be provided for each of a number of metrics that are maintained by the benchmark engine 124. The weights can be provided by an administrator 112 of the data center. The metrics can be used to create a device specification score and/or a popularity score.

A device specification score can be created via a score engine 119 using device specification values and associated weights, as described below. In a number of embodiments, the score engine 119 can be part of a cluster engine 118 and/or the benchmark engine 124. A popularity score can be created using device usage values and associated weights. The device specification score and the popularity score can be scale values (e.g., 1 to 5). For example, a scale value can have a value equal to 1 to 5, where 1 is the lowest score and 5 is the highest score. The device specification score can be created using the below pseudo code:

---

CALC-SPEC-SCALE(X, H, W, $S_{rank}$)

1. Calculate $S_{min} \leftarrow \min[S_X]$
2. Calculate $S_{max} \leftarrow \max[S_X]$
3. $SPEC_{min} \leftarrow 0$
4. $SPEC_{max} \leftarrow 0$
5. n ← length(X)
6. i ← 1
7. while i ≤ n do
   a. $S_i \leftarrow S_i * W_i$
   b. i ← i +1
8. end while 9. $Total_{outcome} \leftarrow \binom{r}{n}$ 10. List L ← SORT($Total_{outcome}$)
11. $SPEC_{min} = \Sigma_{i=1}^{n} \min (X_i)_s * W[X_{is}]$
12. $SPEC_{max} = \Sigma_{i=1}^{n} \max (X_i)_s * W[X_{is}]$
13. $SPEC_{input} = \Sigma_{i=1}^{n} \text{input} (X_i)_s * W[X_{is}]$
14. f ← index (FIND($SPEC_{input}$, L))
15. $S_{rank} \leftarrow (5 * f)/(L_{SPEC_{max}} - L_{SPEC_{min}})$
return $S_{rank}$

---

The pseudocode corresponding to "CALC-SPEC-SCALE (X, H, W, $S_{rank}$)" indicates a number of parameters that are used in creating the device specification score. H represents device data in the data center which can be used to retrieve the benchmark data. X represents the possible metrics. For example, $X_n \rightarrow \{A, B, C, \ldots\}$ represents metrics A, B, and C, which can represent a number of CPUs, a memory size, and a number of cores, respectively. The metrics A, B, and C are represented using a device specification value and a device usage value. For example, A can be represented by $\{S_a, U_a\}$. That is, $S_a$ is a device specification value and $U_a$ is a device usage value for the metric A. B can be represented by $\{S_b, U_b\}$ and C can be represented by $\{S_c, U_c\}$ etc. A particular device specification value and/or a device usage value can be referenced as $X_1 = A \Rightarrow \{S_a, U_a\} \Rightarrow \{S_1, U_1\}$, such that $X_1$ is a first metric in the metrics A, B, C and the device specification value and device usage value $S_1$, $U_1$ correspond to metric A.

W represents weights that are associated with metrics A, B, and C. For example, $W[X] = \{W_a, W_b, W_c, \ldots\}$ can represent weights for the metrics A, B, and C. $W_a$ is associated with metric A, $W_b$ is associated with metric B, and $W_c$ is associated with metric C. A particular weight can be referenced as $W[X_n]$. For example, $W[X_1]$ can be equal to $W_1$ which can be equal to $W_a$, $W[X_2]$ can be equal to $W_2$ which can be equal to $W_b$, and $W[X_3]$ can be equal to $W_3$ which can be equal to $W_c$. The weights $W[X] = 1$, which is defined as $\Sigma_{p=1}^{n} W[X_p] = 1$. The weights can be provided by an administrator 112. That is, the administrator can determine which metrics take priority over other metrics via the weights.

The pseudocode corresponding to reference number 1 (e.g., "Calculate $S_{min} \leftarrow \min[S_x]$") involves determining a smallest device specification value for the metrics (e.g., A, B, and C) and storing the smallest device specification value as Calculate $S_{min}$. The pseudocode corresponding to reference number 2 (e.g., "Calculate $S_{max} \leftarrow \max[S_x]$") involves determining a largest device specification value for the metrics and storing the largest device specification score as Calculate $S_{max}$.

The pseudocode corresponding to reference number 3 (e.g., "$SPEC_{min} \leftarrow 0$") involves initiating $SPEC_{min}$ which represents the smallest weighted device specification value which is initially set to zero. The pseudocode corresponding to reference number 4 (e.g., "$SPEC_{max} \leftarrow 0$") involves initiating $SPEC_{max}$ which represents the largest weighted device specification value. The pseudocode corresponding to reference number 5 (e.g., "$n \leftarrow \text{length}(X)$") involves determining the number of metrics and storing the number of metrics as n.

The pseudocode corresponding to reference number 6 (e.g., involves initiating a counter i with 1. The pseudocode corresponding to reference number 7 (e.g., "while $i \leq n$ do") involves initiating a loop structure (e.g., a FOR loop, a WHILE loop, and/or a DO loop, among other possible loop structures) which can increment i at each iteration of the loop structure until i is less than or equal to n. The lower loop structure shown in reference number 7 is a while loop. Each iteration of the while loop corresponds to reference number 7.a (e.g., "$S_i \leftarrow S_i * W_i$") and reference number 7.b (e.g., "$i \leftarrow i+1$"). The pseudocode corresponding to reference number 7.a references $S_i$ which represents an instance of a device including a device specification value for each of the metrics. $S_i$ is equal to a device specification value multiplied by an associated weights (e.g., $S_i * W_i$). The pseudocode corresponding to reference number 7.b involves incrementing i. The pseudocode corresponding to reference number 8 (e.g., "end while") involves terminating the while loop when $i > n$.

The pseudocode corresponding to reference number 9

$$\left(\text{e.g., "Total}_{outcome} \leftarrow \binom{r}{n}"\right)$$

involves creating and storing all possible permutations of the device specification values as $\text{Total}_{outcome}$. The quantity of device specification values can be $r^n$. The pseudocode corresponding to reference number 10 (e.g., "List $L \leftarrow \text{SORT}(\text{Total}_{outcome})$") involves sorting the weighted device specification values and storing the sorted and weighted device specification values as an ordered list (e.g., "List L").

The pseudocode corresponding to reference number 11 (e.g., "$SPEC_{min} = \Sigma_{i=1}^{n} \min (X_i)_s * W[X_{is}]$") involves adding the smallest weighted device specification values. The smallest weighted device specification values are created by multiplying each of the weights (e.g., $W[X_{is}]$) that are associated with the metrics with the smallest of each of the metrics (e.g., $\min(X_i)_s$). For example, the smallest possible device specification value fix metric A is multiplied by an associated weight (e.g., $W_a$). The smallest weighted device specification values for each of the metrics are summed together. The pseudocode corresponding to reference number 12 (e.g., "$SPEC_{max} = \Sigma_{i=1}^{n} \max (X_i)_s * W[X_{is}]$") involves adding the largest weighted device specification values. The pseudocode corresponding to reference number 13 (e.g., "$SPEC_{input} = \Sigma_{i=1}^{n} \text{input } (X_i)_s * W[X_{is}]$" involves adding the weighted device specification values for the provided instance of a device (e.g., input $(X_i)_s$).

The pseudocode corresponding to reference number 14 (e.g., "$f \leftarrow \text{index }(\text{FIND}(SPEC_{input}, L))$") involves identifying an index of the sum of the weighted device specification values for the provided instance of the device and storing the index as f. The index is in relation to the ordered list L. The pseudocode corresponding to reference number 15 (e.g., "$S_{rank} \leftarrow (5*f)/(L_{SPEC_{max}} - L_{SPEC_{min}})$") involves creating a device specification score (e.g., $S_{rank}$) for the provided instance of the device by multiplying the identified index f by five and dividing the result of the multiplication by the subtraction of $L_{SPEC_{min}}$ from $L_{SPEC_{max}}$. Multiplying the identified index f by five dictates that the $S_{rank}$ is a value between 1 and 6. If $S_{rank}$ instead is a value between 1 and 10, then the index f can be multiplied by 10. The subtraction of $L_{SPEC_{min}}$ from $L_{SPEC_{max}}$ is the difference between an index corresponding to the sum of the smallest weighted device specification values and an index corresponding to the sum of the largest weighted device specification values. The pseudocode associated with return $S_{rank}$ returns the device specification score.

A popularity score can be created by the score engine 119 using device usage values and associated weights, as described below. The popularity score can be created using the below pseudo code:

---

CALC-POPULARITY-SCALE(X, H, W, $P_{rank}$)

1. Calculate $U_{min} \leftarrow \min[U_X]$
2. Calculate $U_{max} \leftarrow \max[U_X]$
3. $USG_{min} \leftarrow 0$
4. $USG_{max} \leftarrow 0$
5. $n \leftarrow \text{length}(X)$
6. $i \leftarrow 1$
7. while $i \leq n$ do
   a. $S_i \leftarrow S_i * W_i$
   b. $i \leftarrow i + 1$
8. end while CALC-POPULARITY-SCALE(X, H, W, $P_{rank}$)

9. $Total_{outcome} \leftarrow \binom{r}{n}$

10. List L ← SORT($Total_{outcome}$)
11. $USG_{min} = \Sigma_{i=1}^{n} \min(X_i)_u * W[X_{iu}]$
12. $USG_{max} = \Sigma_{i=1}^{n} \max(X_i)_u * W[X_{iu}]$
13. $USG_{input} = \Sigma_{i=1}^{n} \text{input}(X_i)_u * W[X_{iu}]$
14. f ← index (FIND($USG_{input}$, L))
15. $P_{rank} \leftarrow (5 * f)/(L_{USG_{max}} - L_{USG_{min}})$
return $P_{rank}$ The pseudocode corresponding to "CALC-POPULARITY-SCALE(X, H, W, $P_{rank}$)" indicates a number of parameters that are used in creating the popularity score, X, H, and W are defined as described above. $P_{rank}$ represents a popularity score.

The pseudocode corresponding to reference number 1 (e.g., "Calculate $U_{min} \leftarrow \min[U_x]$") involves determining a smallest device usage value for the metrics A, B, and C and storing the smallest device usage value as Calculate $U_{min}$. The pseudocode corresponding to reference number 2 (e.g., "Calculate $U_{max} \leftarrow \max[U_x]$") involves determining a largest device usage value for the metrics A, B, and C and storing the largest device specification score as Calculate $U_{max}$.

The pseudocode corresponding to reference number 3 (e.g., "$USG_{min} \leftarrow 0$") involves initiating $USG_{min}$ which represents the smallest weighted device usage value. The pseudocode corresponding to reference number 4 (e.g., "$USG_{max} \leftarrow 0$") involves initiating $USG_{max}$ which represents the largest weighted device usage value. The pseudocode corresponding to reference number 5 (e.g., "n←length(X)") involves determining the quantity of metrics and storing the quantity of metrics as n.

The pseudocode corresponding to reference number 6 (e.g., "i←1") involves initiating a counter i with 1. The pseudocode corresponding to reference number 7 (e.g., "while i≤n do") involves initiating a loop structure which can increment i at each iteration of the loop structure until i is less than or equal to n. Each iteration of the while loop corresponds to reference number 7.a (e.g., "$S_i \leftarrow S_i * W_i$") and reference number 7.b (e.g., "i←i+1"). The pseudocode corresponding to reference number 7.a references $S_i$ which represents an instance of a device including a device usage value for each of the metrics, $S_i$ is equal to a device usage value multiplied by an associated weights (e.g., $S_i * W_i$). The pseudocode corresponding to reference number 7.b involves incrementing i. The pseudocode corresponding to reference number 8 (e.g., "end while") involves terminating the while loop when i>n.

The pseudocode corresponding to reference number 9

$\left( e.g., "Total_{outcome} \leftarrow \binom{r}{n}" \right)$ involves creating and storing all possible device usage values as $Total_{outcome}$. The quantity of device usage values can be $r^n$. The pseudocode corresponding to reference number 10 (e.g., "List L←SORT($Total_{outcome}$)") involves sorting the device usage values and storing the sorted device usage values as an ordered list (e.g., "List L").

The pseudocode corresponding to reference number 11 (e.g., "$USG_{min} = \Sigma_{i=1}^{n} \min(X_i)_a * W[X_{ia}]$") involves adding the smallest weighted device usage values. The smallest weighted usage specification values are created by multiplying each of the weights that are associated with the metrics with the smallest of each of the metrics. For example, the smallest device usage value for metric A is multiplied by an associated weight (e.g., $W_a$). The smallest weighted device specification values for each of the metrics are summed together. The pseudocode corresponding to reference number 12 (e.g., "$USG_{max} = \Sigma_{i=1}^{n} \max(X_i)_a * W[X_{ia}]$") involves adding the largest weighted device usage values. The pseudocode corresponding to reference number 13 (e.g., "$USG_{input} = \Sigma_{i=1}^{n} \text{input}(X_i)_a * W[X_{ia}]$") involves adding the weighted device usage values for the provided instance of a device.

The pseudocode corresponding to reference number 14 (e.g., "f←index(FIND($USG_{input}$, L))") involves identifying an index of the sum of the weighted device usage values for the provided instance of the device and storing the index as f. The index is in relation to the ordered list L. The pseudocode corresponding to reference number 15 (e.g., "$P_{rank} \leftarrow (5*f)/(L_{USG_{max}} - L_{USG_{min}})$") involves creating a device usage score (e.g., $P_{rank}$) for the provided instance of the device by multiplying the identified index f by five and dividing the result of the multiplication by the subtraction of $L_{USG_{min}}$ from $L_{USG_{max}}$. $P_{rank}$ can have a value equal to 1 to 5. The subtraction of $L_{USG_{min}}$ from $L_{USG_{max}}$ is the difference between an index corresponding to the sum of the smallest weighted device usage values and an index corresponding to the sum of the largest weighted device usage values. The pseudocode associated with return $P_{rank}$ returns the device usage score.

As described above, the score engine 119 can create the device specification score and the popularity score. The score engine 119 can provide the device specification score and the popularity score to the cluster engine 118. The cluster engine 118 can reassign a device to a different cluster 120 as described in this example. The cluster engine 118 can assign a new device to the cluster 120 as described in FIG. 2. The cluster engine 118 can also assigned devices to starved clusters.

Assigning a device a cluster 120 can include determining whether the devices 130 meet an SLA policy 122 that is associated with a particular cluster 120. For example, a cluster 120-1 can be associated with a highest priority SLA policy 122. A cluster 120-2 can be associated with a next to highest priority SLA policy 122. A cluster 120-3 can be associated with a next to lowest priority SLA policy 122. A cluster 120-4 can be associated with a lowest priority SLA policy 122. The priority associated with an SLA policy 122 can define a priority that associated clusters have to devices. Clusters 120 with higher priority SLA policies as compared to other SLA policies are assigned devices with greater computing capabilities as defined by the device specification score and the popularity score.

Determining whether a device meets an SLA policy 122 can be based on the device specification score and the popularity score. Ranges of the device specification score can be combined with ranges for the popularity score to create a mapping to an SLA policy 122. For example, a high device specification score and a low popularity score can be mapped to an SLA policy 122 that has a highest priority. A high device specification score and low popularity score can signify that the device is new in the market. A device that is new to the market can be assigned to a cluster with an SLA policy 122 that has a highest priority. In a number of embodiments, a cluster with an SLA policy 122 that has a highest priority can run intensive performance/transactional application. A high device specification score and/or popularity score can have a range of 8 to 10. A medium device specification score and/or popularity score can have a range from of 5 to 8. A low device specification score and/or popularity score can have a range from 1 to 4. The ranges described herein are not limiting. That is, a high device specification score and/or popularity score can have a different range. There can be more or less categories than high, medium, and low.

A medium device specification score and a high popularity score can be mapped to an SLA policy 122 that has a next to highest priority and/or a next to lowest priority. A medium device specification score and high popularity score can signify that the device is at least older than a predetermined amount of time. Examples of a predetermined amount of time can include one month, six months, and/or one year, among other examples of a predetermined amount of time. A device that has a medium device specification score and a high popularity score can be assigned to a cluster with an SLA policy 122 that has a next to highest priority and/or a next to lowest priority.

A high device specification score and a medium popularity score can be mapped to an SLA policy 122 that has a next to highest priority and/or a next to lowest priority. A high device specification score and medium popularity score can signify that the device is gaining popularity in the market. The device may meet the SLA policy 122 that expresses an expectation of an increase to the load that is executing in a number of devices that are in a particular cluster.

A low device specification score and a low popularity score can be mapped to an SLA policy 122 that has a lowest priority. A low device specification score and a low popularity score can signify that the device is outdated. A device that has a low device specification score and a low popularity score can be assigned to a cluster with an SLA policy 122 that has a lowest priority. In a number of embodiments, the device can also be retired instead of being assigned to the cluster with the SLA policy 122 that has the lowest priority.

In a number of embodiments, the device specification score and the popularity score associated for each device in each of the clusters can be re-evaluated periodically. The re-evaluation of the device specification score and the popularity score can be triggered via by an administrator 112. The re-evaluation of the device specification score can also be triggered by the cluster engine 118 based on an event. An event can include a predetermined time lapse, the arrival of a new device, and/or the availability of new benchmark data.

The re-evaluation of a device specification score and the popularity score for a device 130-1 can include disassociating the device 130-1 from cluster 120-4 and assigning the device 130-1 to cluster 120-3. The re-evaluation of a device specification score and the popularity score for device 130-2 can include disassociating the device 130-2 from cluster 120-1 and assigning the device 130-2 to cluster 120-4.

In a number of embodiments, the benchmark engine 124 and/or the cloud engine 118 can execute a number of MRI via a processing resource. A processing resource includes hardware that can execute MRI locally and/or on the cloud. The processing resource can be for example a CPU and/or a graphical processing unit (GPU), among other types of processing resources.

Figure 2:
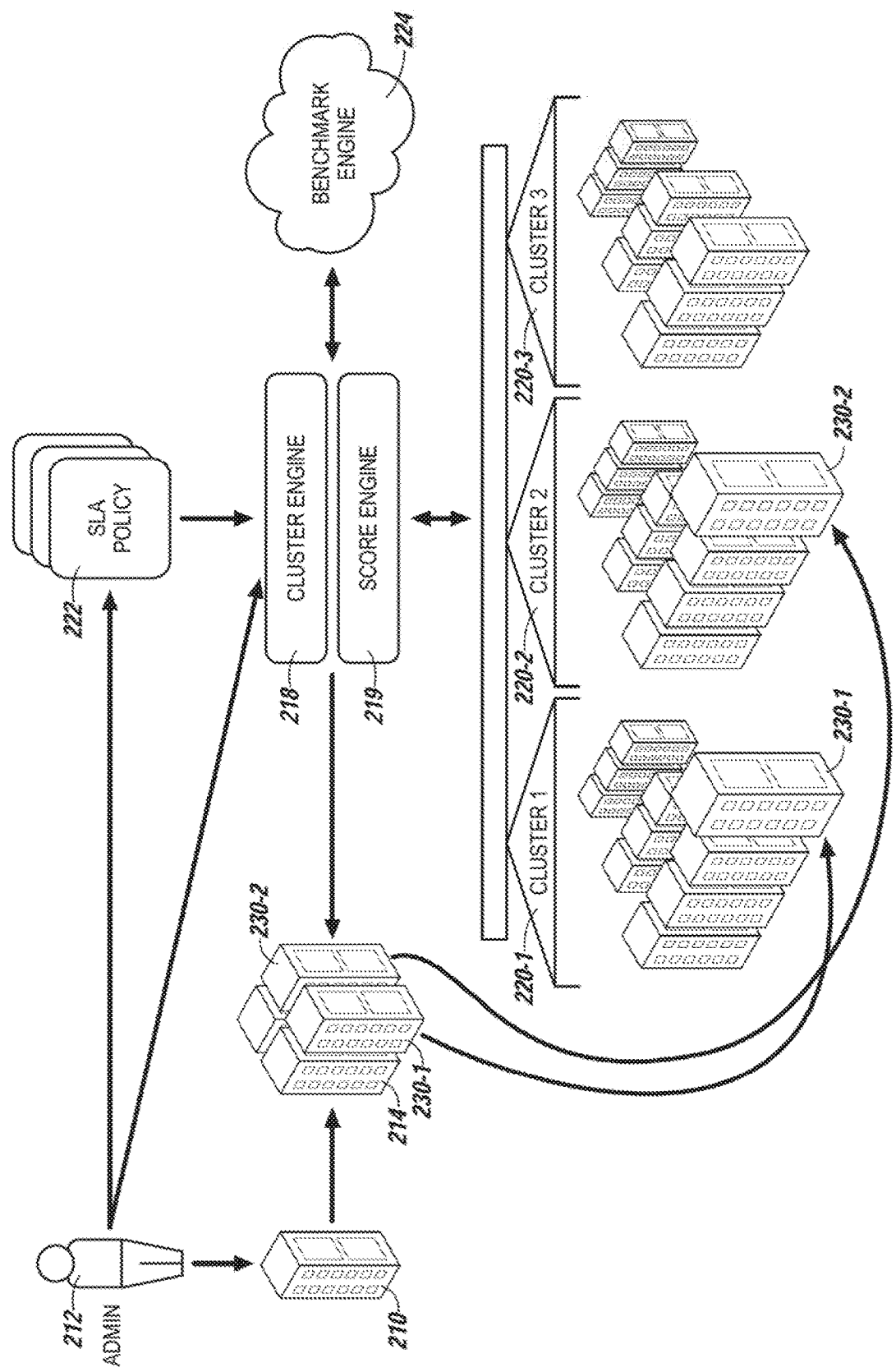
FIG. 2 is a block diagram of a system for assigning devices to clusters according to a number of embodiments of the present disclosure.

FIG. 2 is a block diagram of a system for assigning devices to clusters according to a number of embodiments of the present disclosure. FIG. 2 includes administrator 212, a cluster engine 218, a score engine 219, an SLA policy 222, a benchmark engine 224, clusters 220-1 to 220-3, devices 230-1 and 230-2 which are analogous to administrator 112, a cluster engine 118, a score engine 219, an SLA policy 122, a benchmark engine 124, clusters 120-1 to 120-4, devices 130-1 and 130-2 in FIG. 1, respectively. The clusters 220-1, 220-2, 220-3 are referred to generally as clusters 220. The devices 230-1 and 230-2 are referred to generally as devices 230. FIG. 2 also includes new hardware 210 and new device pool 214.

The new hardware 210 can be received by an administrator 212. The new hardware 210 can be differentiated from a new device in that the new hardware 210 has not been assigned a devices specification score and/or a popularity score and a new device has been assigned a device specification score and/or a popularity score. A new device can be differentiated from a device in that a new device has not previously been assigned to a cluster while a device is assigned to a cluster or has previously been assigned to a cluster. The new hardware 210 can be placed into device pool 214 as a new device 230-1 and/or device 230-2. The score engine 219 can create a device specification score and/or a popularity score for the new device 230-1 and/or device 230-2. The cluster engine 218 can assign the new devices 230 to clusters 220. For example, the cluster engine 218 can assign new device 230-1 to cluster 230-1 based on whether the device specifications score and/or the popularity score associated with the new device 230-1 meet the SLA policy 222 associated with the cluster 220-1. The cluster engine 218 can also assign new device 230-2 to cluster 230-2 based on whether the device specification score and/or the popularity score associated with the new device 230-2 meet the SLA policy 222 associated with the cluster 210-1.

In a number of embodiments, the new devices can be assigned to clusters round robin, in a number of embodiments, a plurality of devices can have a same priority. For example, a first group of clusters can have a highest priority, a second group of clusters can have a next to highest priority, a third group of clusters can have a next to last priority, and/or a fourth group of clusters can have a last priority. Each of the first group of clusters, the second group of clusters, the third group of clusters, and/or the fourth group of clusters can consist of a plurality of clusters. For example, the first group of clusters can include a first cluster, a second cluster, and/or a third cluster. Each of the first cluster, the second cluster, and/or the third cluster can be assigned a plurality of devices.

Each of the clusters in a group of cluster scan have a same priority. For example, the first cluster, the second cluster, and/or the third cluster in the first group of clusters can have a same priority. Assigning a device to a cluster can include assigning a device round robin to the clusters in the group. As used herein, round robin includes assigning a device to each of the clusters in a group a first time before a device is assigned to any of the clusters in the group a second time. For example, a first device can be assigned to the first cluster in the first group of clusters, a second device can be assigned to the second cluster, and a third device can be assigned to a third cluster before a fourth device is assigned to any of the first cluster, the second cluster, and/or a third cluster.

Figure 3:
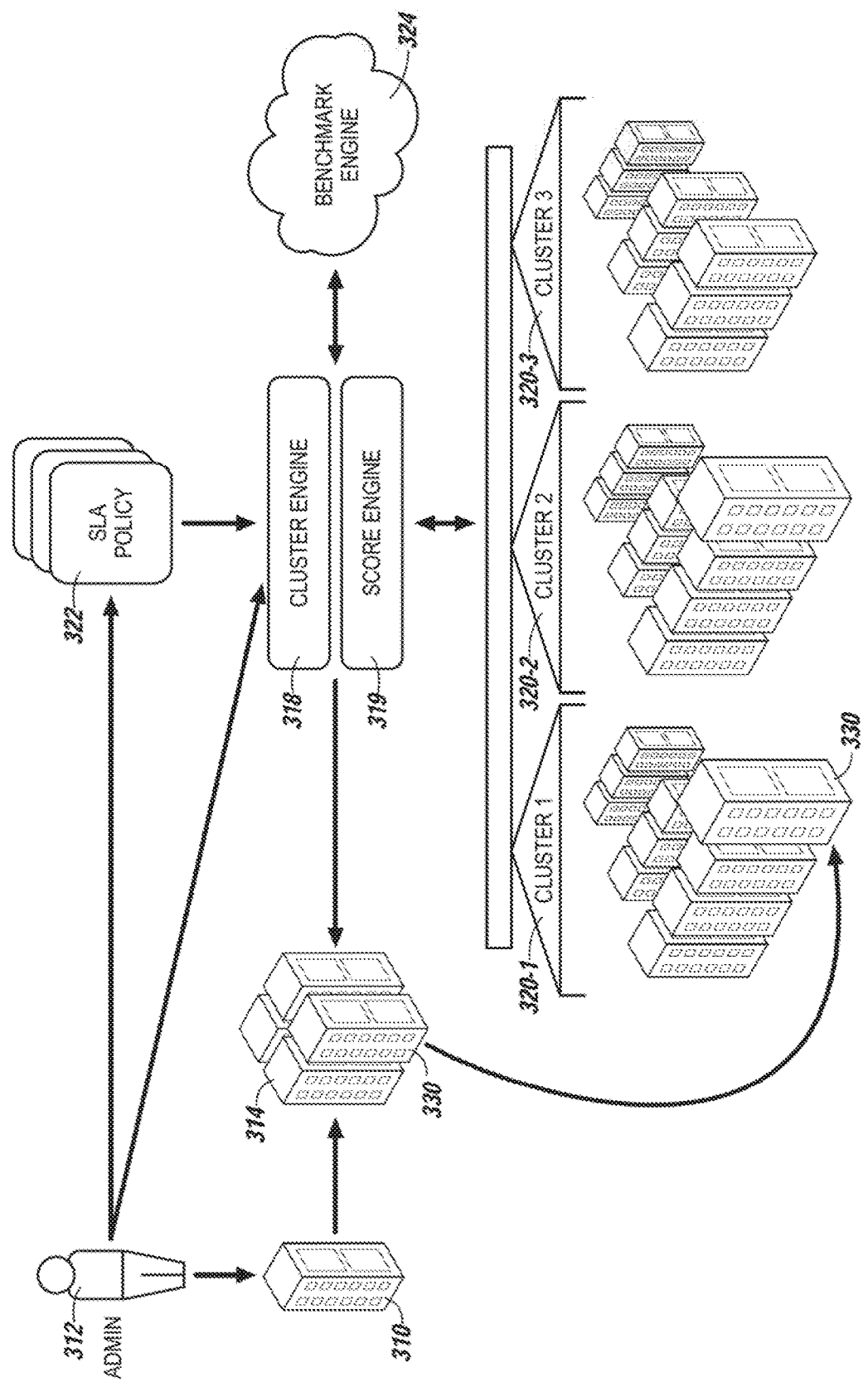
FIG. 3 is a block diagram of a system for assigning devices to clusters according to a number of embodiments of the present disclosure.

FIG. 3 is a block diagram of a system for assigning devices to clusters according to a number of embodiments of the present disclosure. FIG. 3 includes new hardware 310, administrator 312, new device pool 314, a cluster engine 318, a score engine 319, an SLA policy 322, a benchmark engine 324, clusters 320-1 to 320-3, devices 330-1 and 330-2 which are analogous to new hardware 210 administrator 212 new device pool 214, a cluster engine 218, a score engine 219, an SLA policy 222, a benchmark engine 224, clusters 220-1 to 220-4, devices 230-1 and 230-2 in FIG. 2, respectively.

In FIG. 3, a cluster engine can monitor the clusters 320 to determine whether the clusters are starved. In a number of examples, a monitor engine can monitor the clusters 320 to determine whether the clusters are starved. A monitor engine can be third party products. A starved cluster is a cluster that does not have sufficient devices assigned to the cluster to meet the demands of the loads placed upon the cluster sufficient to meet the SLA policy 322. The clusters 320 can be monitored to predict weather a cluster will need to be assigned more devices to meet the demands of the loads placed upon the cluster.

For example, cluster engine 318 and/or a monitor engine can monitor the cluster 320-1, 320-2, and/or 320-3 to determine whether any the new device 330 needs to be assigned a cluster 320-1 that is not meeting the demands of an SLA policy 322. The cluster engine 318 and/or the monitor engine can determine that cluster 320-1 is either not meeting an associated the SLA policy 322 and/or will not meet the SLA policy 322 in the future.

A score engine 319 can create a device specification score and/or a popularity score for the new device 330 and/or for an aging device. The cluster engine 318 can then determine whether a new device 330 can meet the SLA policy 322. If the device 330 meets the SLA policy 322, then the cluster engine 318 can assign the new device 330 to the cluster 320-1.

In a number of examples, a starvation event can be received by cluster engine 318. A starvation event can alert a cluster engine that a cluster does not meet the demands of an SLA policy 322. For example, a starvation event can alert the cluster engine 318 that a particular device in a cluster is not meeting the demands of the loads placed upon cluster 320-1 and/or that the devices in a cluster are no meeting the demands of the loads placed upon the cluster 320-1.

A recommendation can be provided to administrator 312 to better provision the cluster of devices to satisfy the SLA policy. The recommendation can include adding an additional device 330 to the cluster 320-1 based on a device specification score and a popularity score of the device 330.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment,

What is claimed is:

1. A system, comprising:
  a benchmark engine associated with a processor to execute instructions to store benchmark data, in a memory resource, for a device that is assigned to a first cluster of devices;
  a score engine associated with the processor to execute instructions to create with a processing resource:
    a device specification score based on the benchmark data; and
    a popularity score, based on the benchmark data; and
  a cluster engine associated with the processor to execute instructions to:
    determine, with the processing resource, whether to reassign the device to a second cluster of devices based on a policy of the first cluster of devices, a policy of the second cluster of devices, and at least one of the device specification score and the popularity score, wherein the device specification score lies within one of a first range of values a second range of values greater than the first range and a third range of values between the first range and the second range, wherein the popularity score lies within one of a fourth range of values, a fifth range of values greater than the fourth range, and a sixth range of values between the fourth range and the fifth range, and wherein
    the device is assigned to the first cluster of devices in response to the device specification score having a value in the second range and the popularity score having a value in the fourth range, wherein,
    the device is reassigned to the second cluster of devices in response to the device specification score having a value in the third range and the popularity score having a value in the fifth range; and wherein
  the cluster engine is to further execute instructions to:
    run the device on the first cluster in response to the device specification score having the value in the second range and the popularity score having the value in the fourth range; and
    run the device on the second cluster in response to the device specification score having the value in the third range and the popularity score having the value in the fifth range.

2. The system of claim 1, wherein the benchmark data describes the specifications of the device.

3. The system of claim 1, wherein the benchmark data is provided by a third party or a first party.

4. The system of claim 3, wherein the benchmark data is gathered from at least one data center that is associated with the first party.

5. The system of claim 1, wherein the device specification score is a scale value that defines the device's capabilities as compared to other device's capabilities.

6. The system of claim 1, wherein the other device's capabilities that are available in a market.

7. The system of claim 1, wherein the popularity score is a scale value that defines a popularity of the device.

8. The system of claim 7, wherein the popularity of the device is described in comparison to a plurality of other devices in a data center that is associated with the device.

9. The system of claim 7, wherein the popularity of the device is described in comparison to a plurality of other devices in a different data center than a data center under which the device is stored.

10. A method, comprising:
gathering, with a network, benchmark data for a device that is new to a data center;
creating, with a processing resource, a device specification score based on the benchmark data, wherein the device specification score lies within one of a first range of values, a second range of values greater than the first range, and a third range of values between the first range and the second range;
creating, with the processing resource, a popularity score based on the benchmark data, wherein the popularity score lies within one of a fourth range of values, a fifth range of values greater than the fourth range, and a sixth range of values between the fourth range and the fifth range;
associating each of the plurality of clusters of devices with a respective service level agreement (SLA) policy;
mapping the respective SLA policy to a range of device specification scores and popularity scores;
assigning the device to a first one of the plurality of clusters with a highest priority that is associated with a first SLA policy in response to the device specification score having a value in the second range and the popularity score having a value in the fourth range;
running the device on the first cluster in response to the device specification score having the value in the second range and the popularity score having the value in the fourth range;
assigning the device to a second one of the plurality of clusters with a next to highest priority that is associated with a second SLA policy in response to the device specification score, having a value in the third range and the popularity score having a value in the fifth range; and
running the device on the second cluster in response to the device specification score having the value in the third range and the popularity score having the value in the fifth range.

11. The system of claim 1, wherein
the device is assigned to a third cluster of devices in response to the device specification score having the value in the second range and the popularity score having a value in the sixth range, and wherein
the device is reassigned to a fourth cluster of devices in response to the device specification score having a value in the first range and the popularity score having the value in the fourth range.

12. The method of claim 10, wherein the method includes:
assigning the device to a third one of the plurality of clusters with a next to lowest priority that is associated with a third SLA policy in response to the device specification score having the value in the second range and the popularity score having a value in the sixth range; and
assigning the device to a fourth one of the plurality of clusters with a lowest priority that is associated with a fourth SLA policy in response to the device specification score having a value in the first range and the popularity score having the value in the fourth range.

13. The method of claim 12, wherein:
the value in the second range for the device specification score, and the value in the fourth range for the popularity score signifies that the device is new to a market and is suited for servicing a highest priority SLA policy;
the value in the third range for the device specification score and the value in the fifth range for the popularity score signifies that the device is at least older than a predetermined amount of time and is suited for servicing a medium priority SLA policy;
the value in the second range for the device specification score and the value in the sixth range for the popularity score signifies that the device gaining popularity in the market and is suited for an SLA policy that fluctuates in work load; and
the value in the first range for the device specification score and the value in the fourth range for the popularity score signifies that the device is outdated and is suited for a lowest priority SLA policy or phased out the plurality of clusters.

14. The method of claim 10, wherein the method includes:
associating a different group of the plurality of clusters of devices with a respective service level agreement (SLA) policy; and
mapping the respective SLA policy to a range of device specification scores and popularity scores.

15. The method of claim 10, wherein the method includes:
assigning the device to a cluster from a first group of clusters, from the plurality of clusters, that is associated with the first SLA policy in response to the device specification score having the value in the second range and the popularity score having the value in the fourth range;
assigning the device to a cluster from a second group of clusters, from the plurality of clusters, that is associated with the second SLA policy in response to the device specification score having the value in the third range and the popularity score having the value in the fifth range;
assigning the device to a cluster from a third group of clusters, from the plurality of clusters, that is associated with a third SLA policy in response to the device specification score having the value in the second range and the popularity score having a value in the sixth range; and
assigning the device to a cluster from a fourth group of clusters, from the plurality of clusters, that is associated with a fourth SLA policy in response to the device specification score having a value in the first range and the popularity score having the value in the fourth range.

16. The method of claim 15, wherein the method includes:
selecting the cluster from the first group of clusters by selecting a last cluster from the first group of clusters to be assigned a new device;
selecting the cluster from the second group of clusters by selecting a last cluster from the second group of clusters to be assigned a new device;
selecting the cluster from the third group of clusters by selecting a last cluster from the third group of clusters to be assigned a new device; and
selecting the cluster from the fourth group of clusters by selecting a last cluster from the fourth group of clusters to be assigned a new device.

17. The method of claim 10, wherein the method includes assigning the device to one of the plurality of clusters of devices based on a user configuration that provides a weightage for the benchmark data to prioritize fields within the benchmark data that are used to create the device specification score and the popularity score.

18. A non-transitory machine-readable medium storing instructions executable by a processing resource to cause a computing system to:
   execute instructions to store benchmark data, in a memory resource, for a device that is assigned to a first cluster of devices;
   execute instructions to create with a processing resource a device specification score based on the benchmark data; and a popularity score based on the benchmark data; and
   determine, with the processing resource, whether to reassign the device to a second cluster of devices based on a policy of the first cluster of devices, a policy of the second cluster of devices, and at least one of the device specification score and the popularity score, wherein the device specification score lies within one of a first range of values, a second range of values greater than the first range, and a third range of values between the first range and the second range, wherein the popularity score lies within one of a fourth range of values, a fifth range of values greater than the fourth range, and a sixth range of values between the fourth range and the fifth range, and wherein the device is assigned to the first cluster of devices in response to the device specification score having a value in the second range and the popularity score having a value in the fourth range, wherein the device is reassigned to the second cluster of devices in response to the device specification score having a value in the third range and the popularity score having a value in the fifth range; and
   execute instructions to: run the device on the first cluster in response to the device specification score having the value in the second range and the popularity score having the value in the fourth range; and
   run the device on the second cluster in response to the device specification score having the value in the third range and the popularity score having the value in the fifth range.

19. The medium of claim 18, wherein the benchmark data includes:
   the device specification value for each of a plurality of components in the device; and
   the device usage value for each of the plurality of components in the device, wherein the device specification value is used to create the device specification score and the device usage value is used to create the popularity score.

20. The medium of claim 19, comprising instructions executable by the processing resource to create the device specification score by:
   calculating a range of device specification values for each of the plurality of components in the device;
   order a plurality of combinations of device specification values using the range of device specification values;
   calculate an index of device specification values of components in the device as compared to the ordered plurality of combination of device specification values; and
   multiply the index by a constant and divide a result of the multiplication by the range of device specification values to create the device utility score.

21. The medium of claim 19, comprising instructions executable by the processing resource to create the popularity score by:
   calculating a range of device usage values for each of the plurality of components in the device;
   order a plurality of combinations of device usage values using the range of device usage values;
   calculate an index of device usage values of components in the device as compared to the ordered plurality of combination of device usage values; and
   multiply the index by a constant and divide a result of the multiplication by the range of device usage values to create the device utility score.

* * * * *